June 30, 1970  L. W. SPRINKLE  3,518,448
INTERMITTENT TIMER CIRCUIT
Filed Feb. 13, 1969
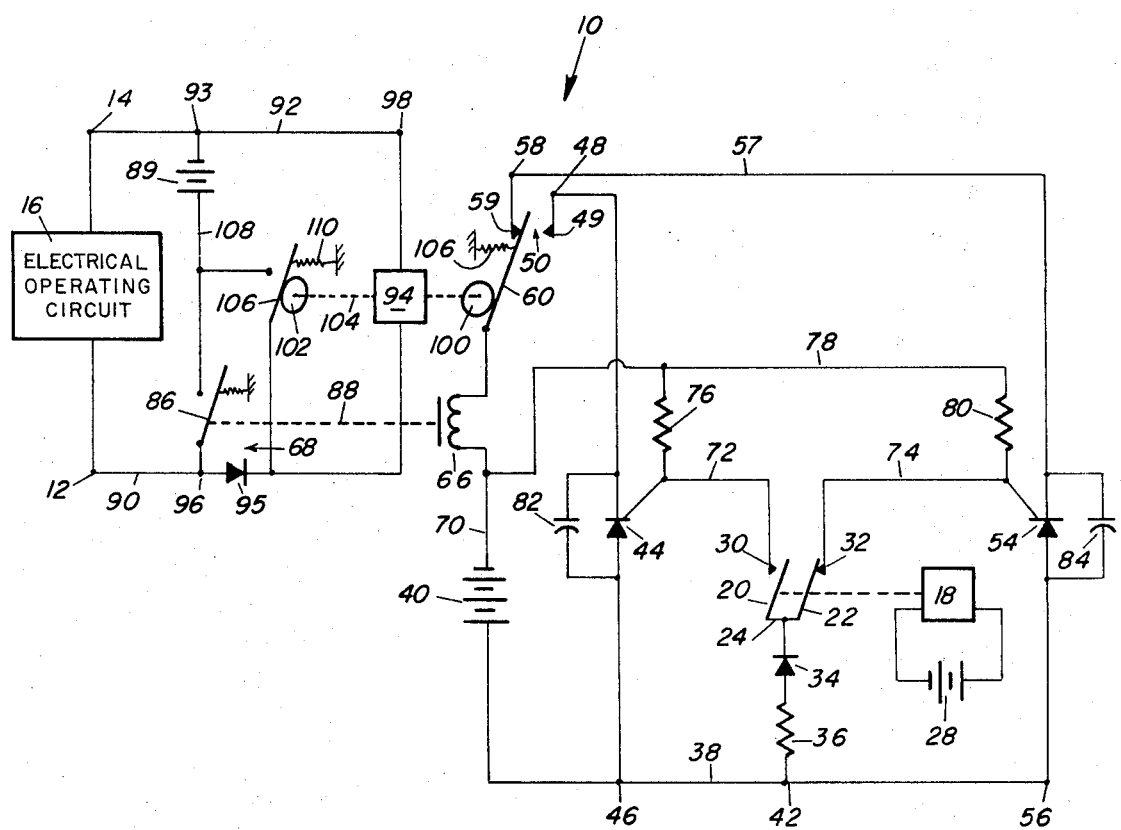
INVENTOR
LELAND W. SPRINKLE
BY Ernest S. Cohen
ATTORNEY

United States Patent Office 3,518,448
Patented June 30, 1970

3,518,448
INTERMITTENT TIMER CIRCUIT
Leland W. Sprinkle, Springfield, Va., assignor to the United States of America as represented by the Secretary of the Interior
Filed Feb. 13, 1969, Ser. No. 798,996
Int. Cl. H02j 13/00
U.S. Cl. 307—114                              8 Claims

ABSTRACT OF THE DISCLOSURE

A timer in an electrical circuit moves a first switch between two alternate positions in a programmed sequence. A signal appears at the output terminals of the electrical circuit when a second switch is closed in a position corresponding to that of the first switch. In response to the output signal, the second switch is moved to an alternate position, turning off the output signal. When the timer, in accordance with the programmed sequence, moves the first switch to its alternate position, corresponding to the alternate position of the second switch, the output signal again appears across the timer circuit output terminals. The second switch is then moved to the original position turning off the output signal. The sequence is repeated at intervals determined by the timer program.

BACKGROUND OF THE INVENTION

This invention relates broadly to electrical timing circuitry, and more specifically to a timing circuit for activating an electrical operating circuit at intermittent programmed intervals.

Prior timers for the intermittent operation of an electrical output circuit employ a mechanical clockwork which activates microswitch contacts in a programmed sequence. These timers require manual winding or excessive electrical power for operation. They are sensitive to temperature changes and are limited to a narrow temperature range of operation. The electrical timer circuit of the present invention overcomes the inadequacies of the prior art and is highly accurate over a wide range of temperatures. An accurate electro-mechanical clock timer, drawing low power, is incorporated in the timing circuit to enable continuous operation with minimum servicing.

SUMMARY OF THE INVENTION

The timer circuit of the present invention provides an intermittent output signal at a pair of electrical terminals for the intermittent activation and de-activation of an electrical operating circuit. The operating circuit forms no part of the present invention and may be any electrical device for which periodic activation and de-activation is required.

The operation of the timer circuit is similar to that of a conventional three-way light control where either one of two remotely located switches are independently used to turn a single light on or off. In the timer circuit a first switch is used to turn the output signal on, and a second switch is used to turn the output signal off. The first switch is driven by an accurate electro-mechanical timer in a programmed sequence between first and second switch positions. The second switch is similarly driven by an electrical re-set motor between first and second positions. Each time the first and second switches are simultaneously in their first or second positions, an output signal appears across the terminals of the timer circuit. Each time an output signal appears, the re-set motor is activated to move the second switch to its alternate position, turning off the timer circuit output signal. This re-sets the timer circuit for re-activation when the timer, following its program sequence, moves the first switch to its corresponding alternate position. An SCR switching circuit is provided intermediate the first and second switches to enable the operation of the first and second switches at different power levels within their design limits.

Accordingly, it is an object of the present invention to provide a timer circuit for intermittently activating and de-activating an electrical operating circuit.

It is a further object of this invention to provide a timer circuit which produces an output signal at intermittent programmed intervals.

It is a still further object of this invention to provide a timer circuit in which a sensitive electro-mechanical timer and switch are isolated from higher power switching circuitry by intermediate solid state switching devices.

These and other objects of the invention will become more fully apparent with reference to the following specification and drawing which describe the preferred embodiment of the invention.

BRIEF DESCRIPTION OF THE DRAWING

The sole figure of the drawing shows an electro-mechanical embodiment of the switching circuit of the present invention.

DESCRIPTION OF THE PREFERRED EMBODIMENT

Referring now to the sole figure of the drawing, one embodiment of an intermittent timer circuit 10 will now be described in detail.

The timer circuit 10 is connected at terminals 12 and 14 to an electrical operating circuit 16. At timed intermittent intervals, corresponding to the program sequence of the timer circuit 10, a signal appears across output terminals 12 and 14, activating the electrical operating circuit 16. At similarly timed intermittent intervals the signal is removed, de-activating the operating circuit.

The program sequence of the timer circuit is established by a clock timer 18 which is joined through a mechanical linkage to contact arms 20 and 22 of a single pole double throw switch 24. Timer 18 is an electro-mechanical clock energized by a battery 28. Contact arms 20 and 22 are moved by the timer 18 and linkage 26 between contact terminals 30 and 32, respectively, of switch 24 in an intermittent sequence programmed into the internal mechanism (not shown) of the clock timer 18. In describing the sequence of the making and breaking of the contacts 30 and 32 of switch 24 the word "intermittent" is used in the sense of "coming and going at intervals" and includes periodic and irregular intervals, as established by the program sequence of the timer 18.

Contact arms 20 and 22 of switch 24 are connected in common to the cathode of a diode 34. The anode of diode 34 is connected through a resistor 36 to a terminal 42 on a common positive lead 38 of a battery 40. The anode of a silicon controlled rectifier (SCR) 44 is connected to a terminal 46 on common lead 38, and the cathode is connected through a terminal 48 to one contact 49 of a two contact position switch 50. The anode of a second SCR 54 is connected to a terminal 56 on common lead 38, and the cathode is connected through a lead 57 and a terminal 58 to the second contact 59 of switch 50. The contact arm 60 of switch 50 is connected in series with a solenoid 66 of a normally open relay 68 to the negative lead 70 of battery 40.

In the alternate positions of contact arm 60, either SCR 44 or SCR 54 is connected in series with battery 40 and solenoid 66. Contact terminals 30 and 32 are connected by leads 72 and 74 to the gates of SCR 44 and SCR 54, respectively. When contact arm 60 touches contact 49 of switch 50, and contact arm 20 touches contact 30 of switch 24 in response to timer 18, SCR 44 fires, energizing solenoid 66. Similarly, when contact arm 64 touches contact 59 of switch 50 and contact arm 22 touches contact 32 of switch 24 in response to timer 18, SCR 54 fires, energizing solenoid 66.

A resistor 76 is joined at one end to lead 72 in the gating circuit of SCR 44, and at the other end to negative lead 70 of battery 40 through a lead 78. A similar resistor 80 is joined at one end to lead 74 in the gating circuit of SCR 54, and at the other end of negative lead 70 of battery 40 through lead 78. The negative voltage established through the resistors 76 and 80 across the gates of SCR 44 and SCR 54 biases the SCR gates to buck the effect of spurious pulses in the circuit. Capacitors 82 and 84 are connected in parallel with SCR 44 and SCR 54, respectively, and absorb spurious pulses in the SCR circuits. Diode 34 and resistor 36, in series with switch 24 of the SCR gating circuit, additionally protect the gating circuit from overloads.

Each time SCR 44 or SCR 54 is fired in series with battery 40, solenoid 66 is energized and a normally open relay switch 86 in relay 68 is closed by solenoid core 88. Relay switch 86 is connected at one end to the positive terminal of a battery 89, and at the other end to a lead 90 at a terminal 96. The negative terminal of battery 89 is connected to a common lead 92 at a terminal 93. Lead 90 terminates at one end with timer output terminal 12, and common lead 92 terminates at one end with timer output terminal 14, enabling the connection of electrical operating circuit 16 in series with the battery 89 and switch 86. An electric re-set motor 94 in series with a diode 95 is connected in parallel with operating circuit 16 through terminals 96 and 98 on leads 90 and 92, respectively, with the anode of the diode connected at terminal 96, so that each time relay switch 86 is closed, both the operating circuit 16 and the re-set motor 94 are activated.

A cam 100 is mounted on a rotor shaft 104 of motor 94 for rotation with the shaft. The contact arm 60 of switch 50 is biased against the face of cam 100 by a spring 106. With the contact arm 60 initially closed on contact 59 of switch 50, one-half revolution of the cam moves the contact arm 60 to closure on the contact 49, and a further one-half revolution returns the contact arm to the initial closure position on contact 59.

A second cam 102 is mounted on rotor shaft 104 for synchronous rotation with cam 100. The contact arm of a normally open switch 106 is connected to a lead 107 between motor 94 and diode 95, and the contact terminal of the switch 106 is connected to a lead 108 between switch 86 and the positive terminal of battery 89. The contact arm of switch 106 is biased against the face of cam 102 by a spring 110. Cam 102 is designed to close switch 106 just prior to the opening of switch 50 by cam 100 for both closed contact positions of switch 50. When the contacts of switch 50 are broken, current flow through solenoid 66 is terminated, causing the normally open relay switch 86 to deactivate operating circuit 16 and re-set motor 94. If the motor were allowed to stop at the initial opening of switch 50 and switch 86, the contact arm of switch 50 would remain in a neutral position between contacts 49 and 59 unless high speed or inertial motor and cam action were provided to close switch 50 independently of further motor excitation. Switch 106 is, therefore, closed to continue excitation of the re-set motor 94 while contact arm 60 swings between contacts 49 and 59. When contact arm 60 completes the contact in each alternate closed position, switch 106 is opened by cam 102 cooperating with spring 110.

Diode 95 is provided to make the activation and de-activation of the operating circuit dependent solely upon the position of switch 50 and relay 68, and independent of the operation of motor 94 and switch 106. Diode 95 enables the operation of both the electrical operating circuit 16 and re-set motor 94 when relay switch 86 is closed and switch 106 is opened, but acts as an open circuit to the operating circuit 16 when switch 106 is closed and switch 86 is open. Where activation of operating circuit 16 during the setting of switch 50 is immaterial, the diode 95 may be eliminated from the circuit.

A complete program sequence of timer circuit 10 will now be described. Timer 18 drives the contact arms 20 and 22 of switch 24 to alternately close the gating circuits of SCR 44 and SCR 54 at intermittent programmed intervals. Dependent upon the position of the contact arm 60 of two position switch 50, either SCR 44 or SCR 54 is connected in series with relay solenoid 66 and battery 40. When the timer circuit 10 is initially turned on by energizing timer 18, a gating pulse is set to one of the SCR's. If the first gating pulse is sent to the open circuited SCR (SCR 44 as shown in the sole figure) no response occurs in the timer circuit 10. When, however, the first pulse reaches the gating circuit of the closed circuited SCR, or when the timer 18 drives switch 24 to complete the gating circuit of the closed circuited SCR on the second gating pulse, a gating current turns on the closed circuited SCR, energizing solenoid 66 and closing relay switch 86. The closing of relay switch 86 connects the operating circuit 16 in series with battery 89, performing the output function of the timer circuit 10.

Simultaneously with the activation of the operating circuit 16, electrical re-set motor 94 starts to rotate cams 100 and 102 in synchronism. Cam 102 rotates to close switch 106. Shortly thereafter, in the cam sequence, cam 100 breaks the contacts of switch 50, turning off the active SCR and solenoid. Relay switch 86 then opens, de-activating the operating circuit. Switch 106 is held in the closed position by cam 102, providing power for re-set motor 94 until contact is completed in the alternate contact position of switch 50. Contact closure of switch 50 occurs after one-half revolution of the cams, at which time switch 106 is opened and the motor turned off, completing one-half cycle of operation of timer circuit 10.

In the initial one-half cycle of operation of the timer circuit an output signal appears across and is removed from output terminals 12 and 14. Upon removal of the signal appearing across terminals 12 and 14, the other SCR in the timer circuit is connected in series with battery 40 and solenoid 66 of relay 68. When timer 18 drives switch 24 to its alternate position in accordance with the timer program, the other SCR fires, activating the operating circuit 16 and re-set motor 94, as in the first half cycle, to complete the switching cycle of circuit 10. The activation and de-activation continues for the duration of the operation of timer 18.

In one exemplary form of the invention an Accutron timer with a model TE–11 Accutron contact closure manufactured by the Bulova Watch Company were used in the gating circuit of the timer circuit 10 to provide accurately regulated gating pulses to 2N1595 silicon controlled rectifiers 44 and 54. A Fischer Porter analog-to-digital gauging station punch was connected to the output terminals of timer circuit 10 and operated in sequence with the program of the Accutron timer which provided a gating pulse at 7.5 minute intervals. The low current drain and accuracy of the Accutron timer in association with the switching speed of the SCR circuitry provided accurate and reliable timing of the gauging station punching circuit.

It can thus be seen that a useful timer circuit for the sequential activation and de-activation of an operating circuit has been provided. In adapting the present exemplary disclosure to a particular timing environment, numerous modifications with the scope of the invention will become apparent to those skilled in the art.

For example, equivalent electronic switching circuitry or an accurate mechanically driven switching system can be substituted for the electro-mechanical timer, switch, and linkage within the scope of the invention. An electronic delay or a relay system can be substituted for the motor-cam switching system employed in the present exemplary disclosure to permit operation of switch 50 after the operating circuit is turned off. The program sequence of SCR gating pulses can be varied to suit the requirements of any operating circuit, and the time between activation and de-activation of the operating circuit similarly varied. The electrical operating circuit could be electrically isolated from the timer circuit by substituting a multiple contact relay for relay 68 and controlling the operating circuit through a set of isolated contacts on the relay. This substitution would enable the timer circuit 10 to activate and de-activate the operating circuit as a simple switch, rather than providing an input signal to the operating circuit.

Other modifications will become apparent to those skilled in the art in the light of the above teachings and within the scope of the appended claims.

What is claimed is:

1. An apparatus for timed intermittent activation and de-activation of an operating circuit comprising:
   a first switch, having first and second alternate contacts,
   means for operating the alternate contacts of the first switch is an intermittent programmed sequence,
   a second switch, having first and second alternate contacts,
   an electrical power source and a means for activating a third switch, in series with the first and second switches,
   means connecting the first contacts of the first and second switches and the second contacts of the first and second switches for completing the circuit between the electrical power source and the means for activating a third switch when the first or second contacts of the first and second switches are each concurrently operated,
   a third switch responsive to the means for activating a third switch,
   means for connecting an operating circuit in series with the third switch,
   means activated by the third switch for switching the second switch to an alternate of the first and second positions of the second switch each time the third switch is activated,
   whereby, upon switching the second switch to an alternate position, the means for activating the third switch is de-energized, and the third switch is de-activated.

2. The apparatus claimed in claim 1 in which the means for operating includes an electro-mechanical timer for opening and closing the alternate contacts.

3. The apparatus claimed in claim 1 in which the means connecting the first contacts of the first and second switches and the second contacts of the first and second switches includes a pair of silicon controlled rectifiers, and the first contacts of the first switch are connected in the gating circuit of one of the rectifiers and the second contacts of the first switch are connected in the gating circuit of the other rectifier.

4. The apparatus claimed in claim 3 in which the means for operating includes an electro-mechanical timer for opening and closing the alternate contacts.

5. The apparatus claimed in claim 1 in which the means activated by the third switch include a cam driven by an electric motor.

6. The apparatus claimed in claim 2 in which the means activated by the third switch include a cam driven by an electric motor.

7. The apparatus claimed in claim 3 in which the means activated by the third switch include a cam driven by an electric motor.

8. The apparatus claimed in claim 4 in which the means activated by the third switch includes a cam driven by an electric motor.

References Cited

UNITED STATES PATENTS

| 2,701,325 | 2/1955 | Altherr | 317—141 X |
| 2,767,362 | 10/1956 | Beaubien | 318—470 X |
| 3,392,286 | 7/1968 | Young | 307—141 |

HERMAN O. JONES, Primary Examiner

T. B. JOIKE, Assistant Examiner

U.S. Cl. X.R.

307—141.8; 318—470